United States Patent
Kästner

(10) Patent No.: US 10,513,060 B2
(45) Date of Patent: Dec. 24, 2019

(54) UNIVERSALLY APPLICABLE CENTRIFUGE PLATE FOR CASTING HOUSING ENDS OF HOLLOW FIBER FILTER MODULES

(71) Applicant: B. BRAUN AVITUM AG, Melsungen (DE)

(72) Inventor: Falk Kästner, Bretnig-Hauswalde (DE)

(73) Assignee: B. Braun Avitum AG (DE)

( * ) Notice: Subject to any disclaimer, the term of this patent is extended or adjusted under 35 U.S.C. 154(b) by 344 days.

(21) Appl. No.: 15/355,895

(22) Filed: Nov. 18, 2016

(65) Prior Publication Data
US 2017/0151693 A1 Jun. 1, 2017

(30) Foreign Application Priority Data

Nov. 30, 2015 (DE) .................. 10 2015 120 761

(51) Int. Cl.
| | |
|---|---|
| B29C 39/02 | (2006.01) |
| B29C 39/08 | (2006.01) |
| B29C 41/20 | (2006.01) |
| B29C 41/04 | (2006.01) |
| B29C 39/26 | (2006.01) |
| B01D 63/02 | (2006.01) |
| B29L 22/00 | (2006.01) |

(52) U.S. Cl.
CPC .............. *B29C 39/02* (2013.01); *B29C 39/26* (2013.01); *B01D 63/021* (2013.01); *B01D 2313/21* (2013.01); *B29L 2022/00* (2013.01)

(58) Field of Classification Search
None
See application file for complete search history.

(56) References Cited

U.S. PATENT DOCUMENTS

| | | | | |
|---|---|---|---|---|
| 2,507,490 | A * | 5/1950 | Cohen .................... | B01D 1/222 204/157.6 |
| 2,750,039 | A * | 6/1956 | Long ................... | D01D 10/0418 210/325 |
| 4,190,411 | A | 2/1980 | Fujimoto | |
| 4,219,426 | A | 8/1980 | Spekle et al. | |
| 4,329,229 | A * | 5/1982 | Bodnar .................. | B01D 53/22 210/321.89 |

(Continued)

FOREIGN PATENT DOCUMENTS

| | | |
|---|---|---|
| CA | 1132914 | 10/1982 |
| CN | 204074280 U | 1/2015 |

(Continued)

OTHER PUBLICATIONS

English translation of JP S59150503 (Year: 1983).*

(Continued)

*Primary Examiner* — Jacob T Minskey
*Assistant Examiner* — Baileigh Kate Darnell
(74) *Attorney, Agent, or Firm* — RatnerPrestia

(57) ABSTRACT

A centrifuge plate is disclosed which is intended for casting housing ends of hollow fiber filter modules and can be rotated around a centrifuge axis. The centrifuge plate includes at least two bearing elements arranged diametrically with respect to the centrifuge axis and provided for supporting a housing of a hollow fiber filter module to be cast, wherein each bearing element is rotatably supported on the centrifuge plate around a bearing axle which is parallel to the centrifuge axis.

9 Claims, 1 Drawing Sheet

(56) References Cited

U.S. PATENT DOCUMENTS

| | | | |
|---|---|---|---|
| 2002/0147100 A1* | 10/2002 | Malcolm | A61M 1/3693 494/45 |
| 2004/0214710 A1* | 10/2004 | Herman | B04B 5/005 494/36 |
| 2011/0118099 A1* | 5/2011 | Rosenblum | B04B 5/0414 494/12 |
| 2016/0095969 A1 | 4/2016 | Maurer et al. | |

FOREIGN PATENT DOCUMENTS

| | | |
|---|---|---|
| DE | 27 11 995 | 9/1977 |
| JP | 59150503 A | 8/1984 |
| JP | 2005-760 | 1/2005 |
| WO | WO 83/00 098 | 1/1983 |
| WO | 2014183852 A1 | 11/2014 |

OTHER PUBLICATIONS

German Search Report for DE 10 2015 120 761.3 dated Jul. 19, 2015.
Chinese Office Action for Application No. 201611081891.3, dated Sep. 12, 2019 with translation, 13 pages.

\* cited by examiner

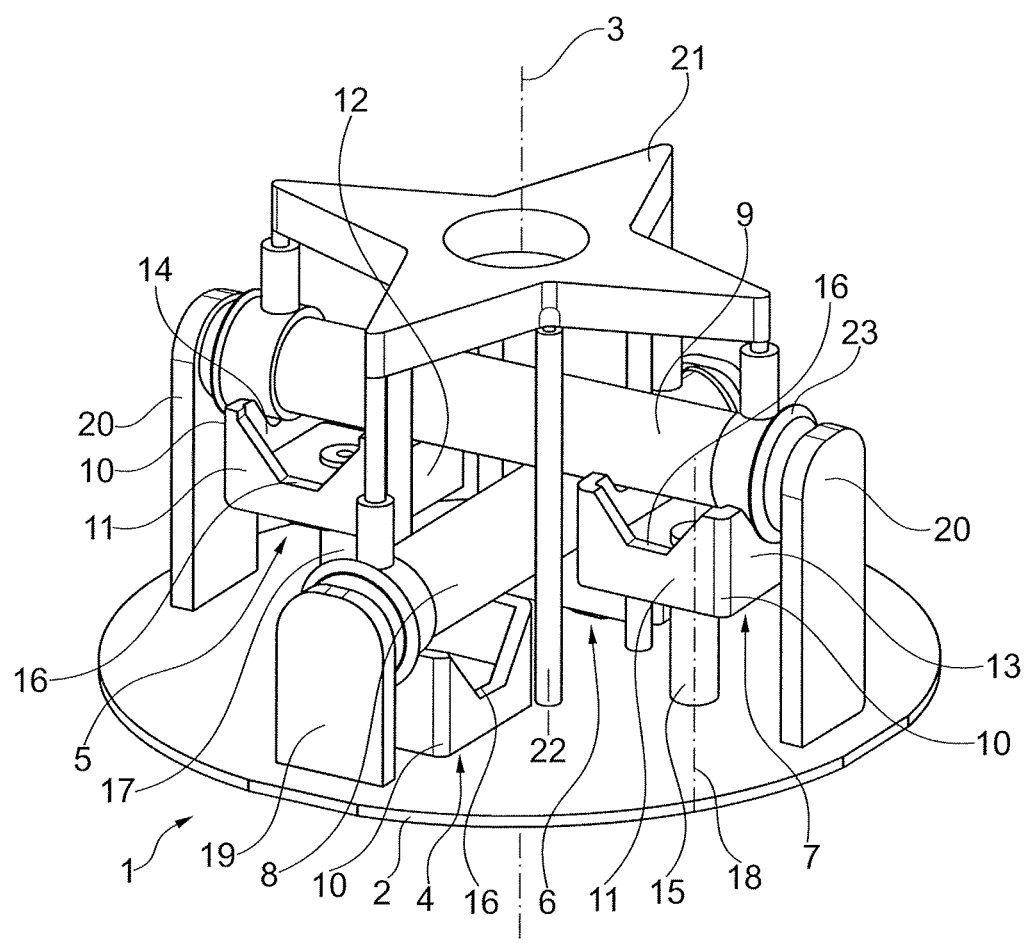

UNIVERSALLY APPLICABLE CENTRIFUGE PLATE FOR CASTING HOUSING ENDS OF HOLLOW FIBER FILTER MODULES

CROSS REFERENCE TO RELATED APPLICATIONS

This application claims priority to German Application DE 10 2015 120 761.3 filed Nov. 30, 2015, the contents of such application being incorporated by reference herein.

FIELD OF THE INVENTION

The invention relates to a universally applicable centrifuge plate for casting housing ends of hollow fiber filter modules.

BACKGROUND OF THE INVENTION

In the production of hollow fiber filter modules according to the prior art, production methods are known in which the housing ends of a more or less elongated and hollow cylindrical housing of a hollow fiber filter module comprising hollow fibers received in the longitudinal direction therein is cast with a casting compound. It is known to cast both ends of a housing at the same time using a centrifuge. Due to the centripetal force acting therein, the casting compound accumulates at both ends of the housing. To this end, a housing of a hollow fiber filter module comprising a fiber bundle inserted therein and a mounted cast cap is supported on a centrifuge plate in such a manner that the longitudinal direction of the filter housing is central and perpendicular to the centrifuge axis. It is further known to arrange two filter housings offset by an angle of 90° and one on top of the other on a centrifuge plate and support them for casting. With a distributor mounted above the filter housing(s), the casting compound is conveyed to the housing ends and fed into the housing ends. The centrifuge plate rotates during casting, so that the casting compound is displaced with the aid of the centrifugal force toward the housing ends and both housing ends can be cast at the same time.

DESCRIPTION OF THE RELATED ART

If it is desired to support different filter housings, for instance filter housings having different geometries or different dimensions, on a single centrifuge plate for the purpose of casting the housing ends, in particular support them such that the housings are stably retained e.g. by a positive-locking fit, this can be achieved with corresponding housing supports that are specifically shaped with regard to the respective housing. Currently, such housing supports are designed as exchange parts and have to be manually exchanged depending on the housing to be cast. It is a particular disadvantage that the use of such exchange parts does not allow an automated manufacture, in particular not an automated casting of hollow fiber filter module housings.

For an automated, in particular fully automated production, the task is to realize a corresponding housing support without any exchange parts and to adjust it in a manner as simple as possible. Two different concepts of a centrifuge plate comprising an adjustable housing support are known and supposed to allow this. On the one hand, there exists a rotary plate comprising the different supports which each are arranged vertically. However, this centrifuge plate is quite high and needs a high technical effort for an automated product change. On the other hand, a centrifuge plate comprising a slewing ring is known, in which the different supports are centrally and horizontally attached on a centrifuge plate. However, said centrifuge plate does not offer sufficient space for an automated equipping in the centrifuge. All in all, the known devices meet the cited demands with respect to size, automated equipment and adjustment unfortunately only to an insufficient degree.

SUMMARY OF THE INVENTION

Starting from the previously described prior art, the present invention is based on the object to eliminate the previously cited disadvantages and to provide in particular a universally applicable centrifuge plate with small size and simple construction and a handling for a preferably fully automated equipping with different filter housings of possibly the same length (e.g., Diacap Pro 13, 16, and 19). In this arrangement, an already available star-shaped distributor, via which a casting compound is supplied to the housing to be cast, is supposed to be usable with a form-locking fixation at a uniform height level.

According to aspects of the invention, this object is met by a centrifuge plate which is intended for casting housing ends of hollow fiber filter modules and can be rotated around a centrifuge axis, comprising at least two bearing elements arranged diametrically with respect to the centrifuge axis and provided for supporting (holding, fixing, receiving) a housing of a hollow fiber filter module to be cast, wherein each bearing element is rotatably supported on the centrifuge plate around a bearing axle which is parallel to the centrifuge axis. The rotational axis of the bearing element could also be tilted toward the center, whereby the respectively used receiving position is situated at a higher level.

It is a particular advantage of the invention that the elements and units of known centrifuge plates, such as for instance supporting pins, star-shaped distributors and axial housing clamping means can be broadly used within the scope of the invention. In this way, it is possible to have recourse to established products, while at the same time the benefits provided by the invention can be utilized. According to aspects of the invention, the rotatable bearing elements are arranged or formed instead of mounts comprising exchangeable housing supports. They can be implemented in particular in the form of rotary plates. Due to the rotatable arrangement of the bearing elements, the latter can be positioned relative to each other and relative to the centrifuge plate in a simple way. In doing so, the accessibility to the bearing elements is not inhibited. This offers the possibility to receive different housing geometries in a universal centrifuge plate and to cast them there, wherein the process of aligning the bearing elements allows to simply adapt the centrifuge plate to different housings.

The alignment of the bearing elements is carried out preferably prior to the charging by an automated handling from above. Alternatively, the alignment may be carried out manually or from below. For adapting them to different housings, the bearing elements are simply swiveled or rotated around their rotational axis and in this way can be positioned or aligned in different receiving positions, wherein each receiving position is designed, adapted and intended for receiving a particular type of housing. The information needed for the respectively required alignment of the bearing elements can be provided and controlled by a machine control system. The positioning of the bearing elements can be detected visually and/or by machine.

Advantageous embodiments of the invention are claimed in the sub-claims and explained in more detail below.

According to one embodiment of the invention, at least one of the bearing elements is supported in such a manner that its respective angular position can be fixed with respect to the bearing axle by snapping in place. To this end, the bearing elements can be equipped with a latching means or locking unit for positioning or directly or indirectly cooperate with such a latching means or locking unit. It is a special advantage that the respective position of a bearing element, which it has to take for receiving and supporting a particular housing, can be adjusted and selected in a reliably and highly accurate reproducible manner.

In one embodiment of the invention the bearing elements each are arranged with an axle pin or axle bolt on a base which is able to rotate around the centrifuge axis, for instance in the form of a plate, disc or any other desired structure. When using such an axle bolt, recourse can be made to established bearings such as axial bearings, radial bearings or plain bearings. Furthermore, it is of advantage that axle pins or axle bolts having different lengths can be arranged on the base. In this way, a plurality of housings can be received on one centrifuge plate, wherein the housings are arranged so as to be on top of each other in the direction of the centrifuge axis.

According to an embodiment of the invention, the bearing elements each have a bearing head which has a quadrangular, hexagonal or octagonal cross-section in a plane transverse to the bearing axle of the respective bearing element, preferably in the form of a square, a regular hexagon or in the form of a regular octagon, comprising a corresponding number of outer walls formed in tangential planes to the bearing axle, with the option that it may also be round, of course. By rotating the bearing elements around the respective rotational axis, the different outer walls of allocated bearing elements can be positioned relative to each other.

According to a further embodiment, the bearing head, for receiving different housings, comprises a plurality of differently shaped (formed) receiving structures (indentations, recesses) preferably at its side facing away from the base. Said receiving structures are each intended and formed for receiving one of the housings, in particular housings with different dimensions. It could also be said that one bearing head comprising different housing supports is mounted. By rotating the bearing elements around the respective rotational axis, the different receiving structures of allocated bearing elements can be positioned relative to each other.

It is of particular advantage if receiving structures which are diametrically opposite each other with respect to the bearing axle are formed for receiving a housing with defined dimensions. In this way, a housing is reliably held on both sides of the rotary axis of the centrifuge, which is particularly stable.

At least one of the bearing elements may be driven preferably in a pneumatic, electric or hydraulic manner so as to be able to rotate around its bearing axle. According to aspects of the invention, the way of driving a bearing element may be carried out in particular in pneumatic, electrical or hydraulic fashion. In a further development of the invention, several bearing elements are driven in a state so as to be operatively connected to each other.

One form of the invention is wherein the centrifuge plate comprises four, six or eight bearing elements. It is preferred that two bearing elements are provided in each case for receiving one housing, which are arranged diametrically opposite each other with respect to the centrifuge axis.

It could also be stated that the general idea which forms the basis of the invention is to equip a universally applicable centrifuge plate with housing seats for different filter housings. This allows to use a unique star-shaped distributor which is attached at a fixed level. Such a centrifuge plate is particularly suitable both for a manual and an automated product change and equipping. According to aspects of the invention, the support of different housings is realized with rotary plates which are horizontally supported on the centrifuge plate and on which the different housing supports are situated. The invention allows in particular to achieve the following advantages or improvements:

The technical solution according to aspects of the invention fulfills, as the only solution known so far, the demands on a centrifuge plate which are involved by an automated manufacture.

The centrifuge plate according to aspects of the invention can be equipped in the centrifuge in a fully automated manner and can be adjusted in the centrifuge in a fully automated manner.

The centrifuge plate according to aspects of the invention is only of small size.

The centrifuge plate according to aspects of the invention allows to use an existing, known star-shaped distributor which is mounted at a fixed height level.

The gist of the invention is the idea to position the exchangeable housing supports on vertical rotary plates which are mounted below the housings. The desired housing support is brought in position by rotating said plates.

BRIEF DESCRIPTION OF THE DRAWINGS

The invention is best understood from the following detailed description when read in connection with the accompanying drawing.

FIG. 1 shows a centrifuge plate 1 according to aspects of the invention in a perspective view. Said centrifuge plate comprises a base 2, here in the form of a circular disc 2. The base 2 is supported or is to be supported in a centrifuge (not illustrated) in such a manner that it is capable of rotating around a centrifuge axis 3 which is orthogonal to the circular plane.

DETAILED DESCRIPTION OF THE PREFERRED EMBODIMENTS

In the illustrated embodiment, four bearing elements 4, 5, 6, 7 are arranged on the base 2. The bearing elements 4 and 6 as well as 5 and 7 form bearing element pairs each serving to support an essentially cylindrical housing 8 and 9, respectively, of a hollow fiber filter module to be cast. The bearing elements 4 and 6 are situated diametrically opposite each other with respect to the centrifuge axis 3. The bearing elements 5 and 7 are also located diametrically opposite each other with respect to the centrifuge axis 3. The pair of the bearing elements 4 and 6 is turned by an angle of 90° in the plane of the base 2 with regard to the pair of the bearing elements 5 and 7.

Each of the bearing elements 4, 5, 6, 7 comprises a bearing head 10. Said head has a square cross-section in a plane parallel to the base 2 and transverse to the centrifuge axis 3. As a result, the bearing head 10 comprises four side walls 11, 12, 13, 14 each defining a receiving structure 16 in the form of a marginal recess in the side wall. The receiving structures 16 formed in the respective side wall 11, 12, 13, 14 differ from each other and each serve for receiving a particular housing type or shape. By way of example, the receiving structure 16 of the side wall 11 may be arranged and designed for receiving a housing with a housing outside diameter D1, the receiving structure 16 of the side wall 12 may be arranged and designed for receiving a housing with a housing outside diameter D2, the receiving structure 16 of the side wall 13 may be arranged and designed for receiving a housing with a housing outside diameter D3 and the receiving structure 16 of the side wall 14 may be arranged and designed for receiving a housing with a housing outside diameter D4.

According to aspects of the invention, the bearing element 4, 5, 6, 7 is rotatable around a rotational axis 18 which extends parallel to the centrifuge axis 3 and centrally through the corresponding bearing element 4, 5, 6, 7. For the sake of better clarity, FIG. 1 exemplarily shows only the rotational axis 18 of the bearing element 7. It is to be noted that within the scope of the invention either the entire bearing element 4, 5, 6,7 or only its bearing head 10 may be designed so as to be rotatable around its rotational axis 18.

Due to the rotatability of the bearing elements 4, 5, 6, 7, the side walls 11, 12, 13, 14 (which are identical or correspond to each other) of the bearing heads 10 of the bearing element pair 4, 6 or of the bearing element pair 5, 7 may be aligned to each other, i.e. toward the centrifuge axis 3. In this way, a four-side bearing head 10 having four different receiving structures 16 allows to support two or four different housing types on the centrifuge plate 1, depending on whether the housings are supported in only one receiving structure 16 or (as is shown) in two receiving structures.

The bearing elements 5 and 7 are supported on the base 2 with bearing journals 17, 15 which are comparatively long. The bearing elements 4 and 6 are supported on the base 2 with relative short bearing journals, having such a small length in the present example that they are concealed in the FIGURE by the bearing head 10 and cannot be seen. Due to the different lengths of the bearing journals, the housings 8, 9 for casting can be arranged on top of each other in the direction of the centrifuge axis 3 in the manner shown in the FIGURE.

For the purpose of clamping the received housings 8, 9 in the axial direction, the centrifuge plate 1 comprises additional mounts 19 and 20 which are arranged radially outside the bearing elements 4, 5, 6, 7 and have their length matched with the length of the corresponding bearing element 4, 5, 6, 7. For suppling and distributing the casting compound to the respective ends of the housings 8, 9, a (star-shaped) distributor 21 is arranged on the base 2. In FIG. 1, said distributor comprises not illustrated pipes for the casting compound which convey said compound to cast caps 23 arranged on the housings 8, 9 via a feeding means designed as a supporting pin 22.

The invention claimed is:

1. A centrifuge plate for casting housing ends of hollow fiber filter modules, the centrifuge plate comprising:
    a base configured to rotate about a centrifuge axis; and
    at least two bearing elements arranged diametrically with respect to the centrifuge axis and provided for supporting a housing of a hollow fiber filter module to be cast, wherein each bearing element is rotatably supported on the base to rotate relative to the base around a respective bearing axle which is parallel to the centrifuge axis, and each bearing element includes a bearing head comprising a plurality of differently shaped receiving structures at a side facing away from the base, said receiving structures each being configured to receive a different housing; and
    wherein, by rotating the bearing elements around the respective bearing axle, the differently shaped receiving structures can be positioned relative to each other to receive the respective different housing.

2. The centrifuge plate according to claim 1, wherein at least one of the bearing elements is supported in such a manner that its respective angular position can be fixed with respect to the bearing axle by snapping in place.

3. The centrifuge plate according to claim 1, wherein the bearing elements each have an axle pin by means of which they are arranged on a base which is able to rotate around the centrifuge axis.

4. The centrifuge plate according to claim 1, wherein the bearing elements each have a bearing head which has a quadrangular, hexagonal or octagonal cross-section in a plane transverse to the bearing axle of the respective bearing element, comprising a corresponding number of outer walls formed in tangential planes to the bearing axle.

5. The centrifuge plate according to claim 1, wherein receiving structures which are diametrically opposite each other with respect to the bearing axle are configured to receive a housing with defined dimensions.

6. The centrifuge plate according to claim 1, wherein at least one of the bearing elements is driven in a pneumatic, electric or hydraulic manner to enable rotation around the respective bearing axle.

7. The centrifuge plate according to claim 1, wherein at least two bearing elements are in operative connection with one another.

8. The centrifuge plate according to claim 1, wherein the at least two bearing elements comprise four, six or eight bearing elements.

9. The centrifuge plate according to claim 1, wherein centrifuge plate comprises an opening extending between the at least two bearing elements arranged diametrically with respect to the centrifuge axis, the opening being dimensioned to receive a housing of a hollow fiber filter module.

* * * * *